(12) United States Patent
Hofmann et al.

(10) Patent No.: US 6,513,089 B1
(45) Date of Patent: Jan. 28, 2003

(54) DUAL BURST LATENCY TIMERS FOR OVERLAPPED READ AND WRITE DATA TRANSFERS

(75) Inventors: Richard Gerard Hofmann, Apex, NC (US); Peter Dean LaFauci, Holly Springs, NC (US); Dennis Charles Wilkerson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,101

(22) Filed: May 18, 2000

(51) Int. Cl.[7] .................................................. G06F 1/00
(52) U.S. Cl. ...................... 710/309; 710/240; 710/107; 710/110; 710/112; 710/27; 710/35
(58) Field of Search ................................. 710/107, 110, 710/112, 113, 116, 119, 123, 307, 309, 310, 311, 240, 242, 243, 20, 21, 29, 31, 35, 39, 40–41, 44, 27

(56) References Cited

U.S. PATENT DOCUMENTS

| | | | |
|---|---|---|---|
| 5,619,661 A | * 4/1997 | Crews et al. ................ 710/119 |
| 5,745,732 A | 4/1998 | Cherukuri et al. ........... 395/495 |
| 5,805,854 A | 9/1998 | Shigeeda ...................... 395/401 |
| 5,815,674 A | * 9/1998 | LaBerge ....................... 710/107 |
| 5,822,549 A | * 10/1998 | LaBerge ....................... 710/107 |
| 5,845,097 A | 12/1998 | Kang et al. ................... 395/297 |
| 5,913,045 A | 6/1999 | Gillepsie et al. ............. 395/309 |
| 5,951,668 A | * 9/1999 | Arimilli et al. .............. 710/309 |
| 5,987,539 A | 11/1999 | Goodrum ...................... 710/55 |
| 5,987,555 A | 11/1999 | Alzien et al. ................. 710/129 |
| 6,230,219 B1 | * 5/2001 | Fields, Jr. et al. ............. 710/22 |
| 6,405,276 B1 | * 6/2002 | Chen et al. ................... 710/310 |
| 6,430,641 B1 | * 8/2002 | Hofmann et al. ............ 710/240 |

* cited by examiner

Primary Examiner—Peter Wong
Assistant Examiner—Raymond N Phan
(74) Attorney, Agent, or Firm—Winstead, Sechrest & Minick, PC; Scott W. Reid (57) ABSTRACT

The present invention discloses a method and system for managing independent read and write buses by dividing the pending read and write request signals and the read and write request priority level signals. The arbitration for use of the read and write buses are done independently for the read and write operations. A higher priority read, for example, can be concurrent with a corresponding lower priority write. Interruption of in process reads or writes is also done using the split arbitrations of the read and write buses leading the disruption of lower priority operations only if the conflicts are concurrent for the same read or write operation.

14 Claims, 7 Drawing Sheets

DUAL BURST LATENCY TIMERS FOR OVERLAPPED READ AND WRITE DATA TRANSFERS

TECHNICAL FIELD

The present invention relates in general to data processing systems, and in particular, to bus systems with independent read and write data buses.

BACKGROUND INFORMATION

Recent advances in silicon densities now allow for the integration of numerous functions onto a single silicon chip. With this increased density, peripherals formally attached to the processor at the card level are now integrated onto the same die as the processor. As a result, chip designers must now address issues traditionally handled by the system designer. In particular, the on-chip buses used in such system-on-a-chip (SOC) designs must be sufficiently flexible and robust in order to support a wide variety of embedded system needs.

The IBM Blue logic core program, for example, provides the framework to efficiently realize complex system-on-a-chip designs. Typically, an SOC contains numerous functional blocks representing a very large number of logic gates. Designs such as these are best realized through a macro-based approach. Macro-based designs provide numerous benefits during logic entry and verification, but the ability to reuse intellectual property is often the most significant benefit. From generic serial ports to complex memory controllers and processor cores, each SOC generally requires the use of common macros.

Many single chip solutions used in applications today are designed as custom chips, each with their own internal architecture. Logical units within such a chip are often difficult to extract and reuse in different applications. As a result, many times the same function is redesigned from one application to another. Promoting reuse by ensuring macro interconnectivity is accomplished by using common buses for inter-macro communications. To that end, the IBM CoreConnect architecture, for example, provides three buses for interconnecting cores, library macros, and custom logic. These buses are the Processor Local Bus (PLB), On-chip Peripheral Bus (OPB) and Device Control Register (DCR) Bus. Other chip vendors may have similar SOC core architectures, for example the Advanced Microcontroller Bus Architecture (AMBA) commercially available from ARM Ltd.

Figure 1:
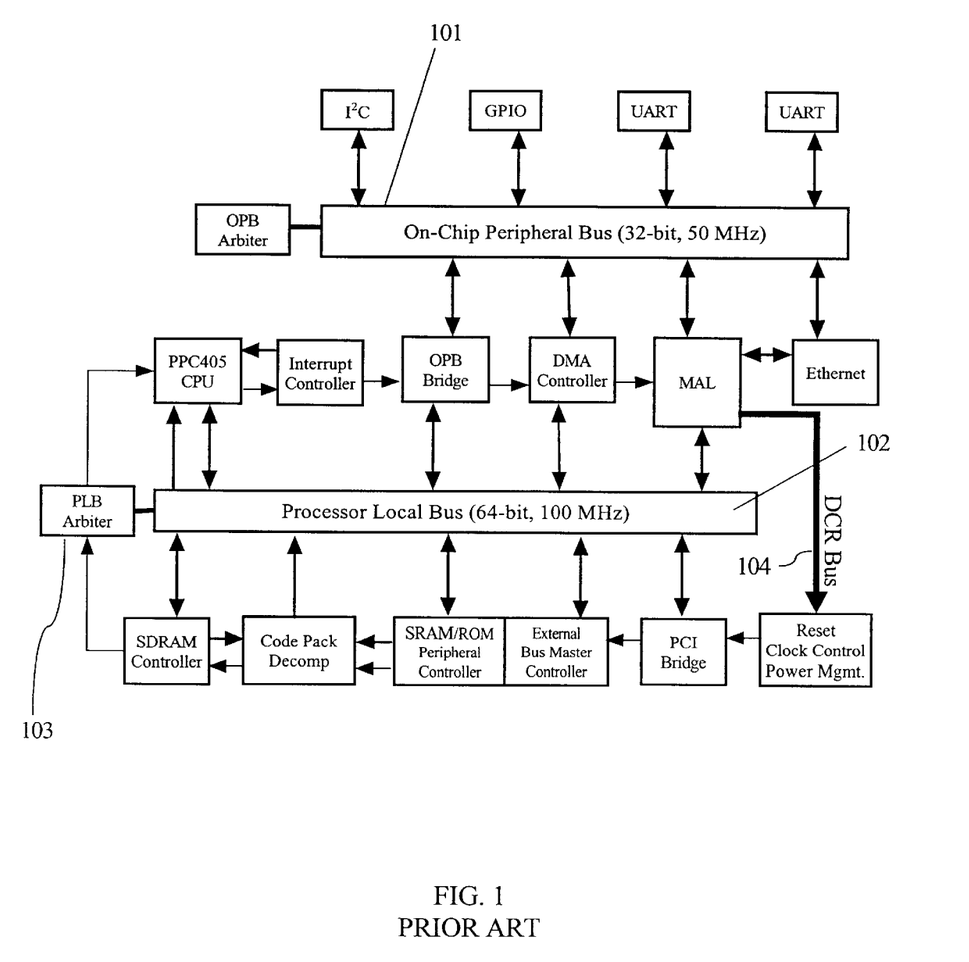
FIG. 1 is a detailed block diagram of the interconnect macros in the prior art Power PC 405GP embedded controller.

FIG. 1 illustrates how the prior art CoreConnect architecture is used to interconnect macros in the PowerPC 405 GP embedded controller. High-performance, high bandwidth blocks such as the Power PC 405 CPU core, PCI bridge and SDRAM controller reside on the PLB 102, while the OPB 101 hosts lower data rate peripherals. The daisy chain DCR bus 104 provides a relatively low-speed data path for passing configuration and status information between the PowerPC 405 CPU core and other on-chip macros. A PLB Arbiter 103 would handle contention between devices on PLB 102.

The CoreConnect architecture shares many similarities with other advanced bus architecture in that they both support data widths of 32 bits and higher, utilize separate read and write data paths and allow multiple masters. For example, the CoreConnect architecture and AMBA 2.0 now both provide high-performance features including pipelining, split transactions and burst transfers. Many custom designs utilizing the high-performance features of the CoreConnect architecture are available in the marketplace today.

The PLB and OPB buses provide the primary means of data flow among macro elements. Because these two buses have different structures and controls, individual macros are designed to interface to either the PLB or the OPB. Usually the PLB interconnects high bandwidth devices such as processor cores, external memory interfaces and DMA controllers. The PLB addresses the high-performance, low latency and design flexibility issues needed in the highly integrated SOC.

In any SOC design, the utilization of the on-chip bus structure is an important consideration. Efficient use of the bus produces better system throughput and response maps to real-time applications. It is therefore essential to architect means by which certain devices attached to the bus do not load or dominate the bus. The PLB has such a means designed into the architecture. This mechanism consists of logic designed into the bus masters to perform long variable-length burst transfers. Each master that attempts long burst transfers is required to monitor a signal, PLB_pendReq (PLB pending request). PLB_pendReq is signaled during long burst transfers which indicates if other master requests are active. Masters implement a programable latency timer such that once their burst transfer has begun on the data bus their timer starts counting down from the program value. When the latency timer reaches zero (times out), the master begins to sample the PLB_pendReq signal. If the PLB_pendReq signal is inactive, it indicates no other masters are requesting use of the bus and bursting may continue as long as PLB_pendReq remains inactive. If the latency timer has timed out and the PLB_pendReq is active, the bursting master must sample priority signals (e.g., PLB_pendPri (0:1)) to determine the relative request priority of other master(s) with the requests which are active. If a pending request priority of another master which is requesting the bus is equal to or greater than that of the bursting master, the bursting master must immediately terminate its burst transfer thereby allowing the pending master access to the bus.

In the above example, the PLB has two separate and completely independent data buses and burst control signals which allows for read and write data transfers to be performed simultaneously. Thus a condition may exist where, for example, a long read burst transfer is in progress and a higher priority write request is generated. Even though the write request would not affect the read transfer in any way, because it only needs access to the address and controls of the write data bus, the higher priority write request will cause a read bursting master to unnecessarily terminate its transfer if its latency timer has timed out. Thus the read master would have to again request the use of the read bus and arbitrate amongst the current pending requests. This has a negative effect on the overall system performance.

Therefore, there exists a need for a solution to the problem of interrupting a process on a bus because a higher priority process seeks access, especially in the case where those operations are read and write burst operations.

SUMMARY OF THE INVENTION

The present invention discloses a method and apparatus for managing a bus system with independent read and write buses. The internal bus structure, connecting high speed units internal to a microprocessor, usually has separate read and write buses. These buses are controlled by a master or arbiter that determines which device has control of the bus at a particular time. Different devices are assigned levels of priority which indicate their service priority in the case of bus contention. In the prior art, if a device was using the bus, for example a burst read or write, the device controlled the bus for the length of time indicated by its priority and the status of its latency timer. If it was a high priority device and another device of lower priority requested the bus, the lower priority device was placed in a queue dependent on its service priority.

The present invention separates the pending bus request signals, latency timers, and the pending bus priority signal for a read and a write operation. In embodiments of the present invention, a high priority device is granted a read request while the write bus may be granted to another device with a lower read request but a higher priority write request. The embodiments of the present invention allow bursting reads and writes to remain operational by a low priority device when a higher priority device requests the corresponding other bus operation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention solves the problem of unnecessarily terminating a burst transfer on one (e.g., read) data bus when higher priority requests are made for the other (e.g., write) data bus. Embodiments of the present invention allow burst read and write transfers to operate on one bus unaffected by requests made to the other data bus thereby producing a better overall system throughput.

Embodiments of the present invention add signals to the signals typically used in the control of a bus, for example the PLB architecture. The description of embodiments of the present invention will use elements of the IBM CoreConnect architecture with the understanding that other similar architectures may correspondingly employ embodiments of the present invention.

Figure 2:
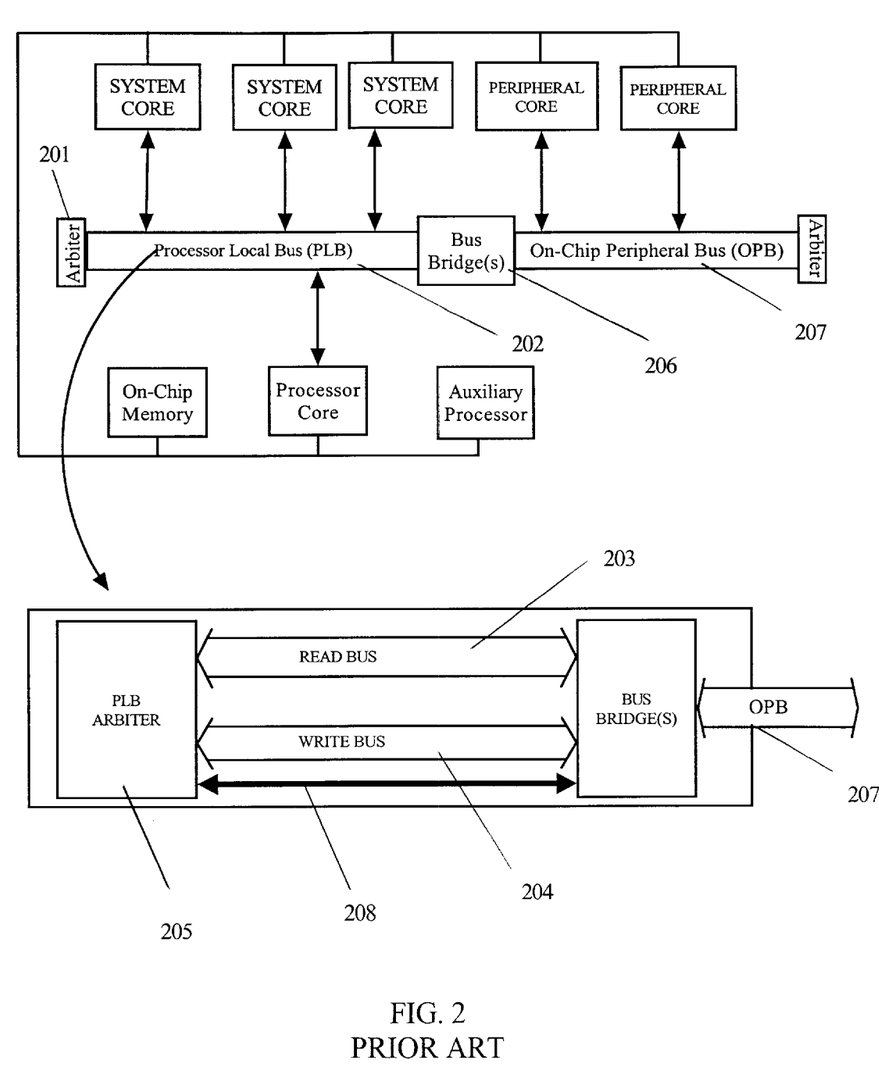
FIG. 2 is a simplified diagram of the interconnect macros on the Processor Local Bus (PLB) and the On-Chip Peripheral Bus (OPB) illustrating independent PLB read and write buses.

FIG. 2 illustrates the prior art IBM CoreConnect architecture with Processor Local Bus (PLB) 202 and On-Chip Peripheral Bus (OPB) 207 connected via a Bus Bridge 206. The PLB 202 is the high speed bus and typically comprises a separate read bus 203, write bus 204 and PLB Arbiter 205. PLB Arbiter 205 would handle contention for the buses by exemplary devices, the system core, the Processor core, etc. Address and transfer qualifiers used in bus communication are coupled on lines 208.

Figure 3:
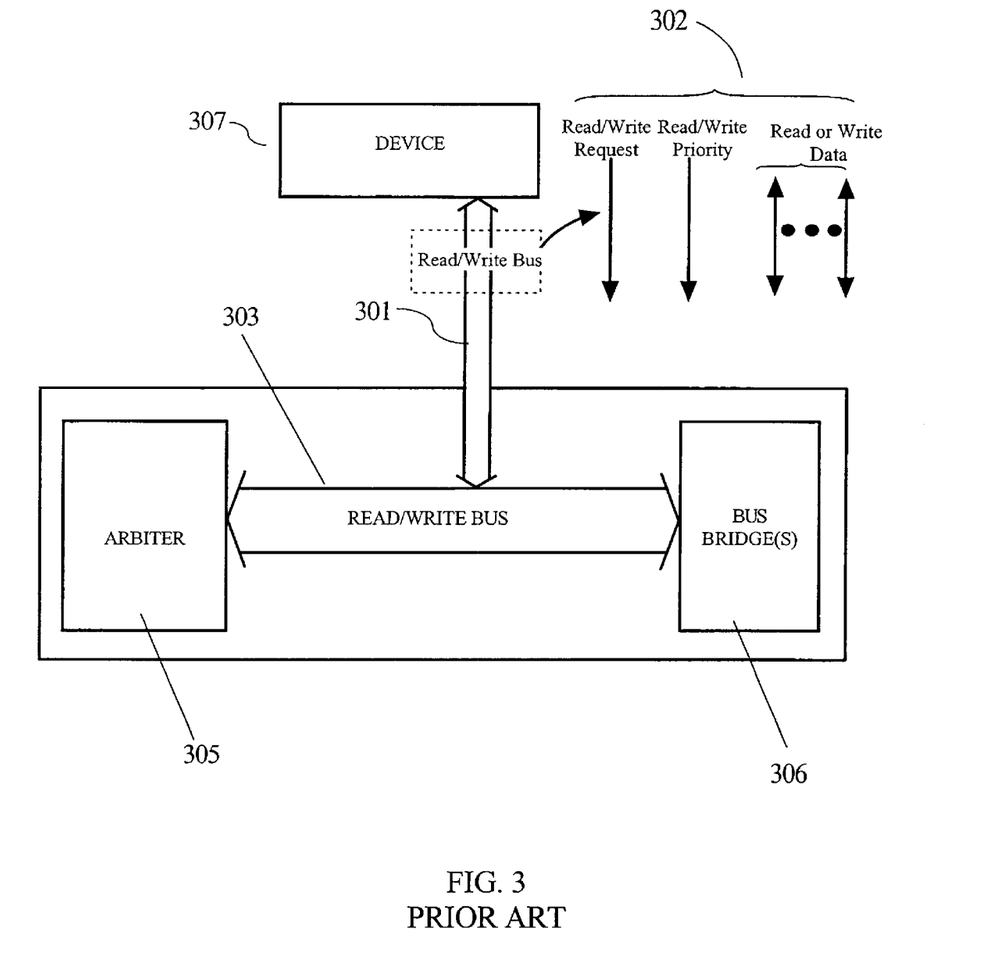
FIG. 3 is an illustration of a prior art read/write bus.

FIG. 3 is a more detailed illustration of prior art read write bus 303 coupled to an exemplary device 307 via a read/write bus 301. Arbiter 305 would handle contention for bus 303 by device 307 and other devices (not shown). Bus signals 302 are separated into a request, read/write, priority, and read and write data signals. In this prior art illustration, a device requests the bus and is granted access to either the read or write facilities. Contending devices (not shown) would have a combined priority for both a read and a write operation. Bus Bridge 306 would connect the bus 303 to other buses. Address and transfer qualifiers (request, read or write, priority, etc.) are coupled on 308.

Figure 4:
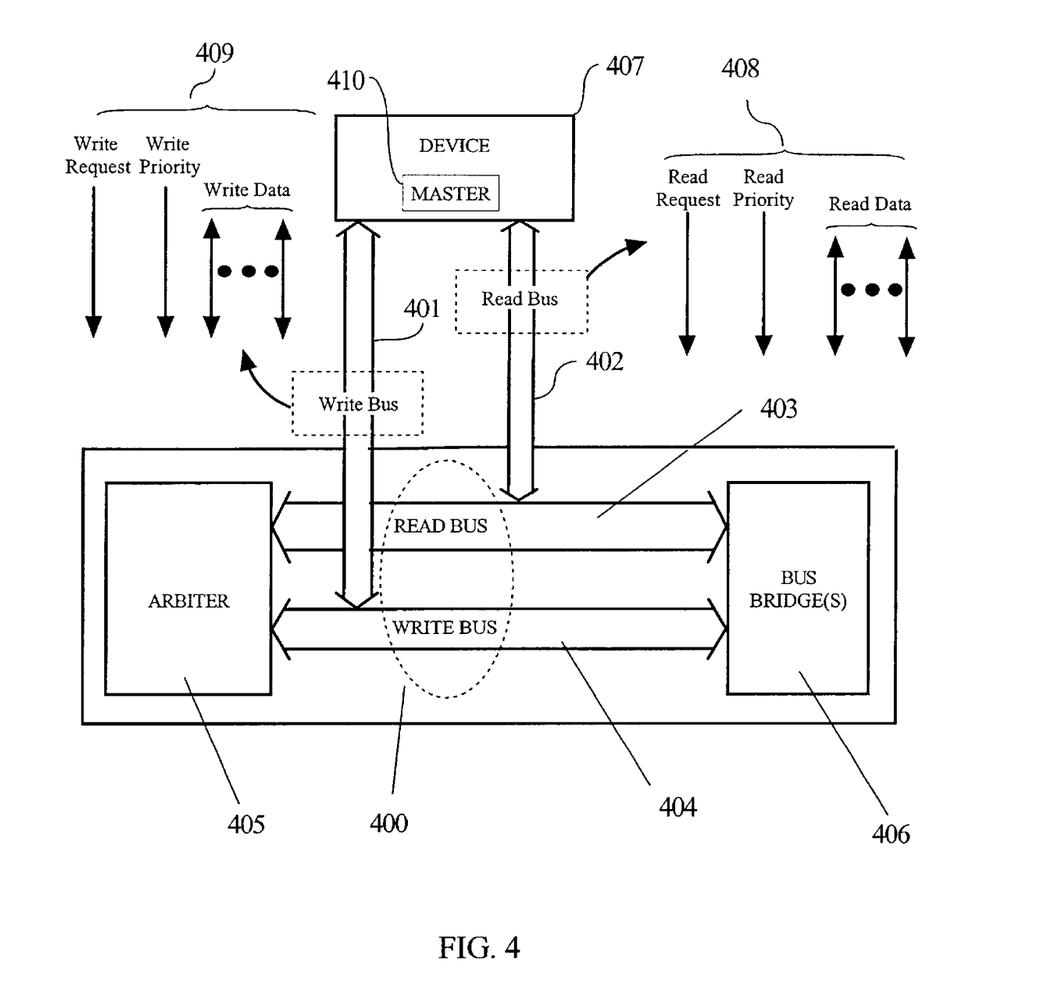
FIG. 4 is an illustration of dual operation of independent read write buses.

FIG. 4 is an illustration of embodiments of the present invention where a bus 400 is shown to have independent read bus 403 and write bus 404. A device 407 is coupled to the read bus 403 using its read bus 402 and write bus 404 using its write bus 401. Arbitration between contending device 407 and other devices (not shown) would be handled by Arbiter 405 and bus 400 would be connected to other buses via bus bridge 406. Write bus data 409 also comprises independent write priority and write request signals. Likewise read bus data 408 comprises independent read priority and read request signals. The independent read and write priority and request signals from device 407 and other devices (not shown) communicating on bus 400 would be coupled to Arbiter 405. Arbiter 405 would also comprise, in embodiments of the present invention, independent latency counters for both the read bus 403 and the write bus 404. The latency counters are started at the beginning of a read or a write operation and are used to determine how much time will be dedicated to an in process operation before the exemplary Arbiter 405 samples pending requests to determine if higher priority requests are pending. Bus masters (not shown) are circuits within each device that manage bus accesses for the device. The bus master for device 407, for example, would present to the exemplary Arbiter 405 its independent read and write requests and access priority for each. Address and transfer qualifiers (request, read/write, priority, etc.) are communicated on bus 411. Other bus masters (not shown) would be incorporated in other devices (not shown) that communicate on bus 400.

In another embodiment of the present invention, a bus master (e.g., Master 410 in a device 407) resides in each device communicating on a bus: In this embodiment each bus master 410 initiates its a read or a write request which is arbitrated by arbiter 405 amongst other devices (not shown) seeking access to bus 400. If bus master 410 wins the bus arbitration, the arbiter 405 broadcasts the read or write to the "slaves" (other devices receiving data and not having a higher priority for the requested operation). A slave will acknowledge the read or write addresses. The master 410, in this embodiment, has its own latency timers and samples read and write pending request and priority signals. The master would then start the granted request (read, write, or both) and start a latency counter(s) (read, write or both) and increment the counter(s) on each data transfer. The master 410 would continue the data transfer monitoring its latency counter(s) and only sampling pending requests and their priority when a latency counter times out. After a latency timer times out, the master determines whether to continue its active data transfers or relinquish the bus (read, write, or both) to a device with a higher priority request pending. The master 407 or other masters (not shown) use their read and write latency timers along with sampling pending requests and priorities to perform reads, writes, or both reads and writes separately or simultaneously over exemplary bus 400. In this manner the latencies of read and write data transfers are independently controlled and requests for idle data busses do not preempt active burst data transfers.

Using the exemplary PLB architecture, the pending request signal, PLB_pendReq, is separated into two signals, pending read request (PLB_rdpendReq) and pending write request (PLB_wrpendReq). When the PLB_rdpendReq signal is true, a master on the bus has a read request active and likewise when PLB_wrpendReq is active a master on the bus has a write request active. An exemplary priority level signal, PLB_pendPri(0:1), is also separated into two different signals PLB_rdpendPri(0:1) (pending PLB read priority level 0:1) and PLB_wrpendPri(0:1) (pending PLB write priority level 0:1). In cases where exemplary priority level signal PLB_pendPri(0:1) was the highest priority pending request, PLB_rdpendPri(0:1) and PLB_wrpendPri(0:1) likewise become the highest priority of all pending read and write requests respectively. Each master on the PLB bus will monitor only the appropriate pending request and priority signals for the type of transfer that it is performing. Thus when a master is performing a long burst read transfer, for example, it will monitor PLB_rdpendReq only after its latency timer times out. If a high priority write request becomes active, then only the PLB_wrpendReq signal will become active. Thus the long read burst will continue unaffected by the write request, which can transparently gain control of the write data bus. If a high priority read request becomes active, the PLB_rdpendReq signal would become active and the master will compare its in process read priority to the PLB_rdpendPri(0:1) signals. If the read pending priority is equal to or greater than the priority of the in process read bursting master, it will terminate the burst to allow the high priority read access to the read data bus. The same operation holds true if read and write transfers are reversed in the preceding example. Further a master which performs long burst reads and long burst writes can actually do both simultaneously because of the independent data buses. The master would have two independent latency timers, one for the read and one for the write data bus. In such an implementation, a master could initiate a read burst and then a write bust transfer and independently monitor pending requests and pending priorities for each data bus. In such an arrangement, the master would only terminate one of the burst transfers for a specific higher priority request, while the other burst continues uninterrupted.

Figure 5:
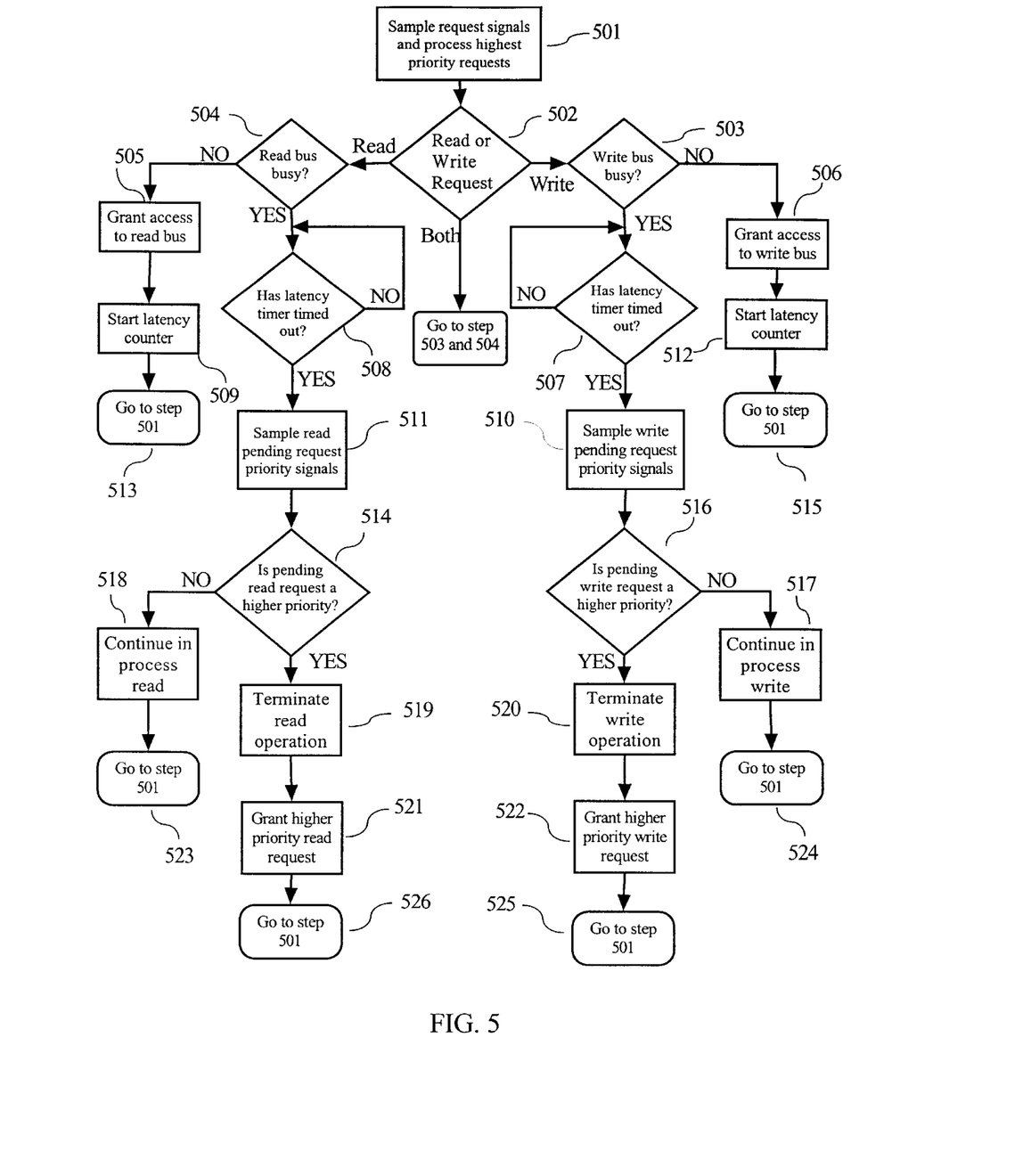
FIG. 5 is a flow diagram of steps employed in embodiments of the present invention.

FIG. 5 is a flow diagram illustrating method steps in embodiments of the present invention. In step 501 the master request signals are sampled and the master processes the highest priority requests. If a request is pending, it is either a read, a write, or possibly a read and a write request in step 502. If the request is a read, then a determination is made in step 504 as to whether the read bus is busy. If the read bus is not busy in step 504, then access to the read bus is granted in step 505 and a read bus latency counter is started in step 509 and a return to step 501 is executed in step 513 awaiting new requests. If the read bus is busy in step 504 then the read latency counter is tested in step 508. If the read latency counter has not timed out, then a wait is executed by a return to step 508. Once the read latency timer has timed out in step 508, then the pending read request priority signals are sampled in step 511. If the pending request is a higher priority in step 514, then the in process read is terminated in step 519 and read bus access is granted to the pending request in step 521 and a return to step 501 is executed in step 526 awaiting new read or write request signals. If the pending read request is not a higher priority in step 514 then the in process read is continued in step 518 and a return is executed to step 501 in step 523.

In step 501, if a write request has been received then step 503 is executed and a determination is made whether the write bus is busy. If the write bus is busy in step 503, then the write latency timer is tested in step 507. If the write latency timer has not timed out, a wait is issued by a return to step 507. If the write latency timer has timed out in step 507, then the write pending request priority signals are sampled in step 510. The pending write request priority is tested in step 516. If the pending write request is a higher priority, then the active write operation is terminated in step 520 and the higher priority write request is granted in step 522 and a return to step 501 is executed in step 525. If the pending write request is not a higher priority in step 516, then the in process write operation is continued in step 517 and a return to step 501 is executed in step 525. In step 503, if the write bus is not busy the write bus access is granted in step 506. The write latency counter is started in step 512 and a return to step 501 is issued in step 515 when the latency counter times out.

Figure 7:
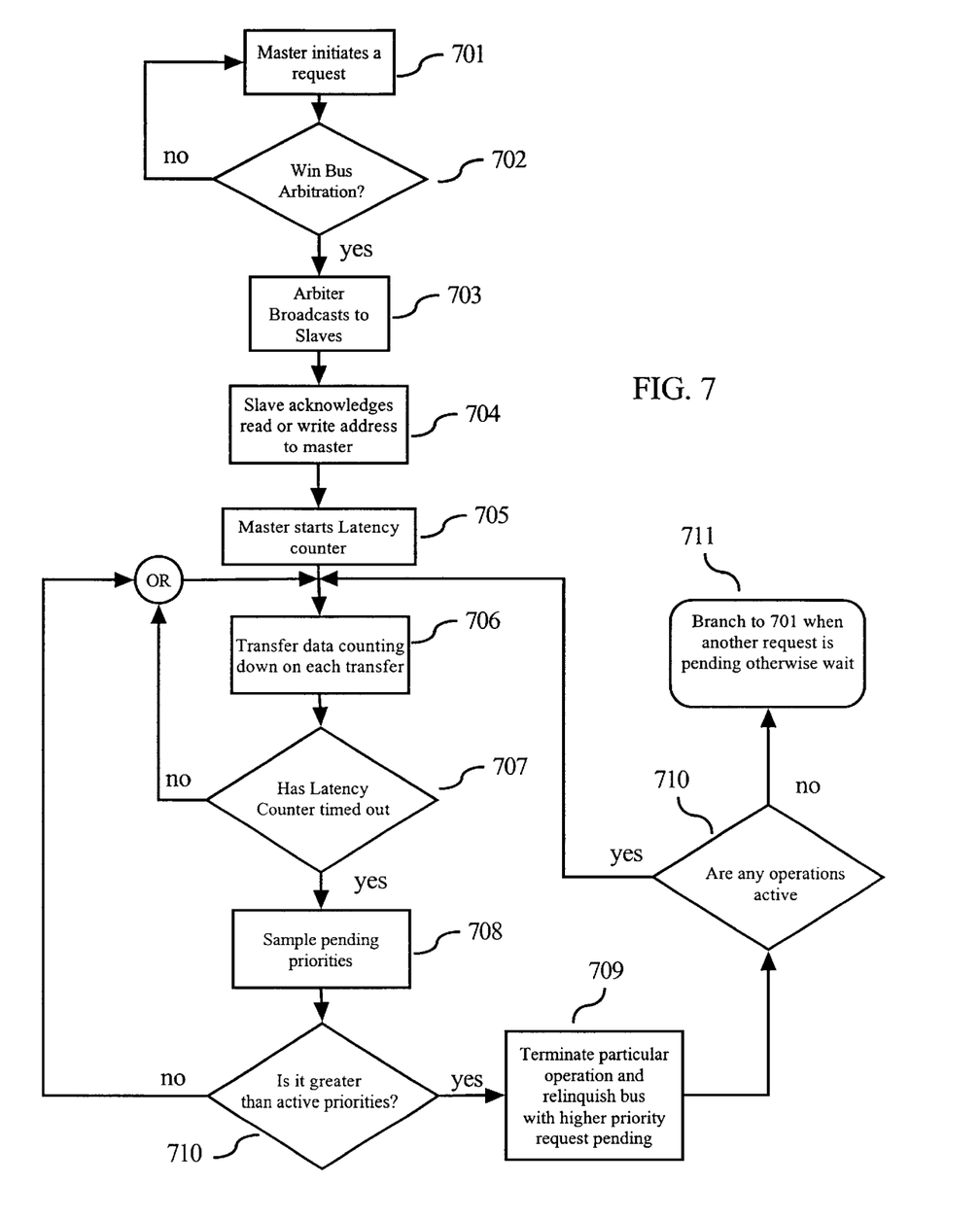
FIG. 7 is a flow diagram illustrating method steps in embodiments of the present invention.

FIG. 7 is a flow diagram of operations initiated by a master according to embodiments of the present invention. In step 701, a master initiates a read or write.(referred to hereafter in FIG. 7 as just a request). Typically the master may only assert either a read or write request at any one time. Once the first request is address acknowledged, the second request may be activated. If the second request is concurrently granted then multiple operations will occur concurrently as illustrated by the steps in FIG. 7. In step 702, a test is done to determine if an arbiter has granted the request. If the request is not won, then a return to step 701 is issued and the request remains asserted. If the bus is won for the request in step 702, then the arbiter broadcasts to all slave devices on the bus in step 703. In step 704, a slave acknowledges to the master the requested address. In step 705, the master starts a latency counter and in step 706 begins a transfer counting down the latency counter on each data transfer. In step 707, the latency counter is tested for time out. If a latency counter has not timed out, then data transfer continues. If in step 707 the latency counter has timed out, then the pending priorities are sampled in step 708. If a higher priority exists, then in step 709 the operation is terminated and the particular bus with a higher priority request pending is relinquished. If a higher priority does not exist in step 708, then continue transfers by a branch to step 706. In step 710, a test is made whether the device still has active operations (only a read or a write in an active read and write may have been terminated). If a device has active operations, a branch to step 706 continues remaining operation. If there are no active operations in step 710, then either a branch to step 701 is initiated a new request is issued or a wait is initiated for a new request. Once a particular request has be acknowledged a second request may also be acknowledged as stated above. In the case of multiple accepted requests, a parallel read and write operation may occur concurrently each process using the method steps outlined in FIG. 7.

Figure 6:
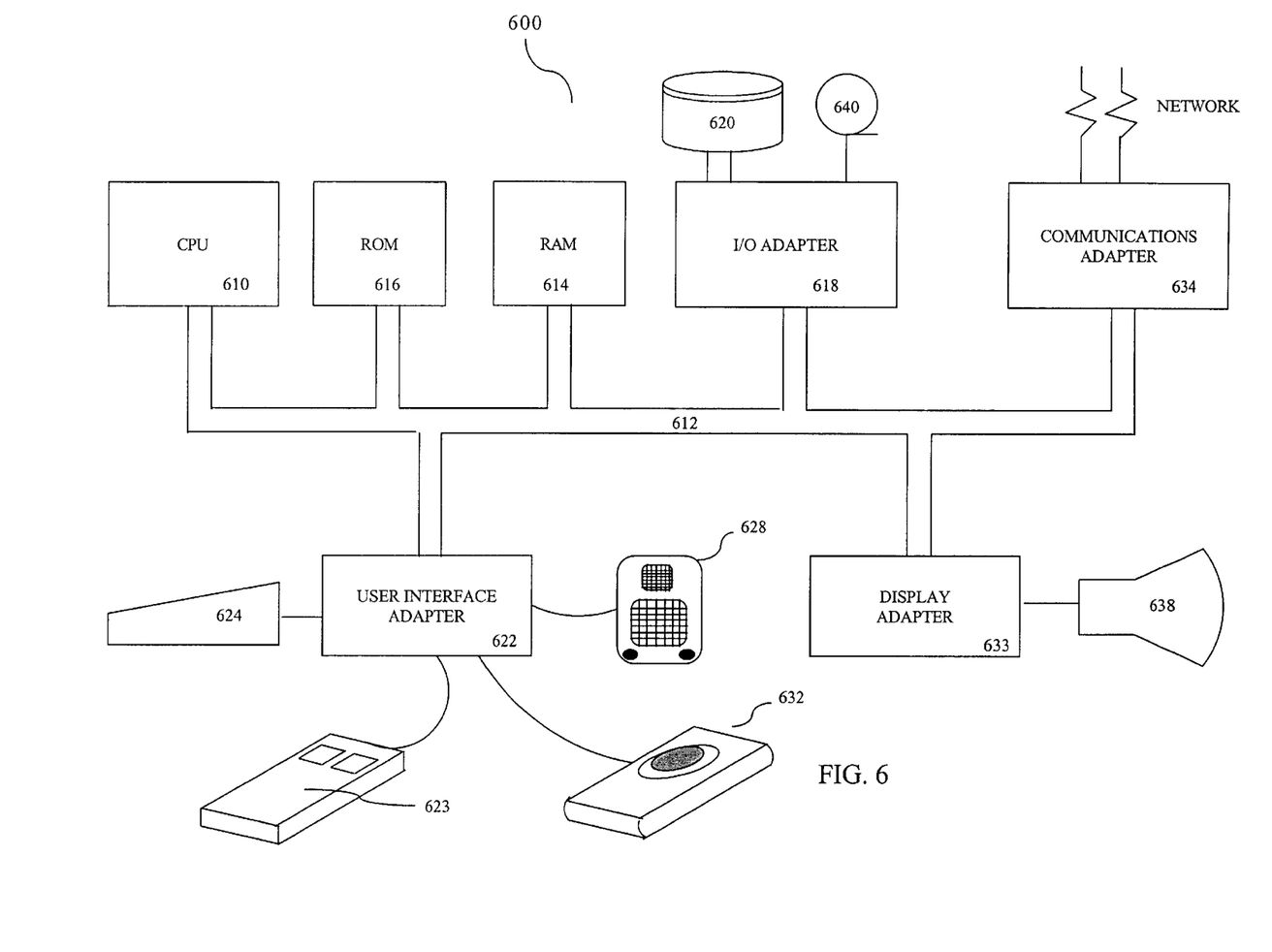
FIG. 6 is a data processing system configured in accordance with of the present invention.

Referring to FIG. 6, an example is shown of a data processing system 600 which may be used for the invention. The system has a central processing unit (CPU) 610, which is coupled to various other components by system bus 612. Read-only memory ("ROM") 616 is coupled to the system bus 612 and includes a basic input/output system ("BIOS") that controls certain basic functions of the data processing system 600. Random access memory ("RAM") 614, I/O adapter 618, and communications adapter 634 are also coupled to the system bus 612. I/O adapter 618 may be a small computer system interface ("SCSI") adapter that communicates with a disk storage device 620. Communications adapter 634 interconnects bus 612 with an outside network enabling the data processing system to communicate with other such systems. Input/Output devices are also connected to system bus 612 via user interface adapter 622 and display adapter 633. Keyboard 624, track ball 623, mouse 623 and speaker 628 are all interconnected to bus 612 via user interface adapter 622. Display monitor 638 is connected to system bus 612 by display adapter 633. In this manner, a user is capable of inputting to the system through the keyboard 624, trackball 632 or mouse 623 and receiving output from the system via speaker 628 and display 638.

Various buses employed in the data processing system 600 may employ independent read and write buses and as such may employ embodiments of the present invention where contention for the independent read and write buses are handled using independent read and write bus access signals, access priority signals and latency timer signals. In embodiments of the present invention employed in buses of the data processing system of FIG. 6, independent read and write bus access is granted to a higher priority device after a latency timer of an active process (read or write) has timed out. Lower priority read or write requests are placed in a queue and serviced after a higher priority active process (read or write) has completed.

While embodiments of the present invention are applicable to the IBM CoreConnect architecture, other chip vendors may have similar SOC core architectures, for example Advanced Microcontroller Bus Architecture (AMBA) from ARM Ltd in which embodiments of the present invention are applicable.

Although the present invention and its advantages have been described in detail, it should be understood that various changes, substitutions and alterations can be made herein without departing from the spirit and scope of the invention as defined by the appended claims.

What is claimed is:

1. A method of managing a bus comprising independent read and write buses, comprising the steps of:

receiving, in a bus arbitration device, read and write request signals from devices communicating on said independent read and write buses;

receiving, in said bus arbitration device, read and write request priority level signals from said devices communicating on said independent read and write buses;

queuing independently in response to said read and write request priority level signals, said read and write request signals;

comparing independently in said bus arbitration device said read and write request priority level signals of in process read and write operations with said read and write request priority level signals of said queued independent read and write requests;

granting independent read and write bus access to higher priority read and write requests over in process read and write operations;

generating independent read and write latency timer signals at a start of a granted read or a write operation on said bus; and interrupting independently said in process bus read or write operations in response to corresponding ones of said read and write request signals, said read and write request priority level signals and said read and write latency timer signals.

2. The method of claim 1, wherein said read and write latency timer signals establish latency times during which a granted read or write bus operation is allowed to continue before a bus master will sample priority levels of said pending read and write requests.

3. The method of claim 2, wherein access to said read and write buses is independently granted to higher priority read and write requests after a corresponding in process read or write operation was active for one of said latency times.

4. The method of claim 1, wherein said read and write operations are burst mode operations.

5. A system for managing a data bus having independent read and write buses, said system comprising:

request circuits operable for receiving and storing read and write request signals as pending read and write request signals from devices communicating on said independent read and write buses;

request priority level circuits operable for receiving and storing read and write priority level signals corresponding to each of said pending read and write request signals;

read and write latency timers for determining independently read bus and write bus latency times;

priority encoding circuits operable for setting a highest pending read and write priority from said read and write priority level signals; and an arbitration circuit operable for generating separate device read and write bus access signals in response to receiving (1) said read and write priority level signals, (2) said read and write request signals and (3) said read and write bus latency signals, for contending devices communicating on said data bus.

6. The system of claim 5, further comprising:

a bus access circuit receiving said bus access signals and enabling separate read and write bus accesses; and an interrupt circuit operable for accepting arbitration signals and interrupting independently said read and write operations of said data bus.

7. The system of claim 5, wherein said latency times are times during which a granted read or write bus operation is allowed to continue before a bus master will sample priority levels of said pending read and write requests.

8. The system of claim 7, wherein access to said read and write buses is independently granted to higher priority bus access requests after a corresponding in process read or write operation was active for one of said latency times.

9. The system of claim 7, wherein said read or write operation is a burst mode operations.

10. A data processing system, comprising:
   a central processing unit (CPU);
   shared random access memory (RAM);
   read only memory (ROM);
   an I/O adapter;
   a display adapter;
   a display; and
   a bus system coupling devices internal to said CPU said bus system comprising a bus with separate read and write buses with a bus controller, said bus controller comprising:
      request circuits operable for receiving and storing read and write request signals as pending read and write request signals from devices communicating on said independent read and write buses;
      request priority level circuits operable for receiving and storing read and write priority level signals corresponding to each of said pending read and write request signals;
      read and write latency timers for determining independently read bus and write bus latency times;
      priority encoding circuits operable for setting a highest pending read and write priority from said read and write priority level signals; and
      an arbitration circuit operable for generating separate device read and write bus access signals in response to receiving (1) said read and write priority level signals, (2) said read and write request signals and (3) said read and write bus latency signals, for contending devices communicating on said data bus.

11. The data processing system of claim 10, further comprising:
   a bus access circuit receiving said bus access signals and enabling separate read and write bus accesses; and
   an interrupt circuit operable for accepting arbitration signals and interrupting independently said read and write operations of said data bus.

12. The data processing system of claim 10, wherein said latency times are times during which a granted read or write bus operation is allowed to continue before a bus master will sample priority levels of said pending read and write requests.

13. The data processing system of claim 12, wherein access to said read and write buses is independently granted to higher priority bus access requests after a corresponding in process read or write operation was active for one of said latency times.

14. The data processing system of claim 12, wherein said read or write operations are burst mode operations.

* * * * *